US009624329B2

(12) United States Patent
Aida et al.

(10) Patent No.: US 9,624,329 B2
(45) Date of Patent: Apr. 18, 2017

(54) PROCESS FOR PRODUCING FLUORINATED COPOLYMER

(71) Applicant: ASAHI GLASS COMPANY, LIMITED, Chiyoda-ku (JP)

(72) Inventors: Shigeru Aida, Chiyoda-ku (JP); Toshinori Tomita, Chiyoda-ku (JP); Toshinori Eto, Chiyoda-ku (JP); Kazuo Umemura, Chiyoda-ku (JP); Atsushi Tsuji, Chiyoda-ku (JP)

(73) Assignee: Asahi Glass Company, Limited, Chiyoda-ku (JP)

(*) Notice: Subject to any disclaimer, the term of this patent is extended or adjusted under 35 U.S.C. 154(b) by 25 days.

(21) Appl. No.: 14/099,477

(22) Filed: Dec. 6, 2013

(65) Prior Publication Data
US 2014/0100344 A1  Apr. 10, 2014

Related U.S. Application Data

(63) Continuation of application No. PCT/JP2012/065158, filed on Jun. 13, 2012.

(30) Foreign Application Priority Data

Jun. 15, 2011 (JP) ................ 2011-133132

(51) Int. Cl.
*C08F 228/02* (2006.01)
*B01D 1/22* (2006.01)
*C08F 214/26* (2006.01)
*C08F 214/18* (2006.01)
*C08F 6/00* (2006.01)
*C08F 220/28* (2006.01)

(52) U.S. Cl.
CPC ............ *C08F 228/02* (2013.01); *B01D 1/225* (2013.01); *B01D 1/226* (2013.01); *C08F 6/003* (2013.01); *C08F 214/18* (2013.01); *C08F 214/26* (2013.01); *C08F 214/262* (2013.01); *C08F 220/28* (2013.01)

(58) Field of Classification Search
CPC ...... C08F 6/003; C08F 228/02; C08F 220/08; C08F 214/26; C08F 214/262
See application file for complete search history.

(56) References Cited

U.S. PATENT DOCUMENTS

| 3,357,477 | A | * | 12/1967 | Monty | .................. | B01D 1/225 |
| | | | | | | 159/13.1 |
| 4,022,438 | A | * | 5/1977 | Shishido | ............. | B01F 7/00391 |
| | | | | | | 366/310 |
| 4,068,061 | A | * | 1/1978 | Nakagawa | ................ | C08F 6/06 |
| | | | | | | 428/461 |
| 4,116,888 | A | * | 9/1978 | Ukihashi | ............. | C08F 214/184 |
| | | | | | | 521/27 |
| 4,321,344 | A | * | 3/1982 | Sumitani | .................. | B01J 19/18 |
| | | | | | | 526/64 |
| 4,981,554 | A | * | 1/1991 | Loconsolo | ............. | B01D 1/225 |
| | | | | | | 159/13.1 |
| 5,425,849 | A | * | 6/1995 | Feres | ..................... | B01D 1/225 |
| | | | | | | 159/13.1 |
| 5,583,166 | A | * | 12/1996 | Okamoto | .................. | B29B 9/08 |
| | | | | | | 523/340 |
| 6,627,047 | B1 | * | 9/2003 | Ijiri | ........................ | B01D 1/225 |
| | | | | | | 159/13.1 |
| 6,660,803 | B1 | * | 12/2003 | Yasuhara | ................ | C07C 67/10 |
| | | | | | | 524/805 |
| 8,377,998 | B2 | * | 2/2013 | Tomita | ................... | C08F 214/18 |
| | | | | | | 521/27 |
| 2003/0158374 | A1 | * | 8/2003 | Kono | .................. | C08G 65/2696 |
| | | | | | | 528/425 |
| 2004/0097675 | A1 | * | 5/2004 | Ameduri | ............. | C08F 214/222 |
| | | | | | | 526/247 |
| 2005/0197487 | A1 | * | 9/2005 | Kurashima et al. | .......... | 528/480 |
| 2010/0048956 | A1 | | 2/2010 | Isaka et al. | | |
| 2010/0227992 | A1 | * | 9/2010 | Hintzer | ................... | C08F 14/18 |
| | | | | | | 526/255 |

FOREIGN PATENT DOCUMENTS

| CA | 2497332 A1 * | 8/2005 | | |
| JP | 57-76002 | 5/1982 | | |
| JP | 62-179508 | 8/1987 | | |
| JP | 7-118332 | 5/1995 | | |
| JP | 10-195212 | 7/1998 | | |
| JP | 3781498 | 3/2006 | | |
| JP | 2007-119526 | 5/2007 | | |
| JP | WO 2011149095 A1 * | 12/2011 | ......... | C01B 21/0935 |
| KR | WO 02053608 A1 * | 7/2002 | ................ | C08F 2/06 |
| WO | 2008/069301 | 6/2008 | | |
| WO | 2009/133902 | 11/2009 | | |

OTHER PUBLICATIONS

Derwent Abstract of JP 57076002 A1, 1985.*
U.S. Appl. No. 14/080,955, filed Nov. 15, 2013, Fukunaga, et al.
U.S. Appl. No. 14/082,702, filed Nov. 18, 2013, Hattori, et al.
U.S. Appl. No. 13/975,726, filed Aug. 26, 2013, Abe, et al.
International Search Report issued Sep. 11, 2012 in PCT/JP2012/065158, filed on Jun. 13, 2012.

* cited by examiner

*Primary Examiner* — Nicole M Buie-Hatcher
(74) *Attorney, Agent, or Firm* — Oblon, McClelland, Maier & Neustadt, L.L.P.

(57) ABSTRACT

A process for producing a fluorinated copolymer includes polymerizing a fluorinated monomer having a carboxylic acid functional group or a sulfonic acid functional group and a fluorinated olefin by a solution polymerization method in a polymerization medium to obtain a mixture containing a fluorinated copolymer, an unreacted monomer and the polymerization medium. The mixture is continuously or intermittently transferred to an evaporation vessel provided with a stirrer and heating the mixture with stirring in the evaporation vessel to evaporate and recover the unreacted monomer and the polymerization medium.

10 Claims, No Drawings

PROCESS FOR PRODUCING FLUORINATED COPOLYMER

This application is a continuation of PCT Application No. PCT/JP2012/065158, filed on Jun. 13, 2012, which is based upon and claims the benefit of priority from Japanese Patent Application No. 2011-133132 filed on Jun. 15, 2011. The contents of those applications are incorporated herein by reference in its entirety.

TECHNICAL FIELD

The present invention relates to a process for producing a fluorinated copolymer having carboxylic acid functional groups or sulfonic acid functional groups.

BACKGROUND ART

As an ion exchange membrane to be used for an alkali chloride electrolysis method in which an alkali chloride aqueous solution such as salt water is electrolyzed to produce an alkali hydroxide and chlorine, a membrane comprising a fluorinated copolymer having carboxylic acid functional groups or sulfonic acid functional groups has been known. The fluorinated copolymer is obtainable, for example, by copolymerizing a fluorinated monomer having a carboxylic acid functional group or a sulfonic acid functional group, such as a perfluorovinyl ether and a fluorinated olefin such as tetrafluoroethylene (hereinafter referred to as TFE).

As a polymerization method, an emulsion polymerization method, a solution polymerization method, a suspension polymerization method or a bulk polymerization method may, for example, be mentioned. After the fluorinated copolymer is obtained by such a polymerization method, a step is required to separate and recover the polymerization medium or the unreacted monomer from the obtained fluorinated copolymer, and specifically, the following methods have been known.

(1) A method of pouring a slurry obtained by solution polymerization to a poor solvent such as methanol to agglomerate the fluorinated copolymer (for example, Patent Document 1).

(2) A method of extracting the unreacted monomer from an emulsion obtained by emulsion polymerization by solvent extraction, and adding an acid to agglomerate the fluorinated copolymer (for example, Patent Document 2).

(3) A method of purging the pressure of the reactor after polymerization, and evacuate the reactor of air by means of a cold trap with stirring to recover the polymerization medium and the unreacted monomer (Patent Document 3).

However, in the methods (1) and (2), in order that the fluorinated monomer having a carboxylic acid functional group or a sulfonic acid functional group which is expensive, is completely recovered, it is necessary to carry out agglomeration operation repeatedly several times and to distill off the solvent used for agglomeration to recover the fluorinated monomer, thus leading to a high cost.

In the method (3), as the recovery of the polymerization medium and the unreacted monomer proceeds, the fluorinated copolymer is agglomerated in the reactor, whereby heat transfer from the reactor to the agglomerated fluorinated copolymer is inhibited, and the polymerization medium and the unreacted monomer contained in the agglomerated fluorinated copolymer are hardly heated. Thus, the fluorinated monomer having a carboxylic acid functional group or a sulfonic acid functional group which is expensive cannot completely be recovered in a short time.

Accordingly, a method for efficiently recovering the polymerization medium and the fluorinated monomer having a carboxylic acid functional group or a sulfonic acid functional group has been desired.

PRIOR ART DOCUMENTS

Patent Documents

Patent Document 1: WO2009/133902
Patent Document 2: JP-A-2007-119526
Patent Document 3: Japanese Patent No. 3,781,498

DISCLOSURE OF INVENTION

Technical Problem

The present invention provides a process for producing a fluorinated copolymer, which comprises polymerizing a fluorinated monomer having a carboxylic acid functional group or a sulfonic acid functional group and a fluorinated olefin in a polymerization medium, whereby from a mixture containing a fluorinated copolymer, an unreacted monomer and the polymerization medium, the unreacted monomer and the polymerization medium can efficiently be recovered; or a process for producing a fluorinated copolymer, which comprises polymerizing a fluorinated monomer having a carboxylic acid functional group or a sulfonic acid functional group and a fluorinated olefin, whereby from a mixture containing a fluorinated copolymer and an unreacted monomer, the unreacted monomer can efficiently be recovered.

Solution to Problem

The process for producing a fluorinated copolymer according to a first embodiment of the present invention comprises the following steps (I) and (II):

(I) a step of polymerizing a fluorinated monomer having a carboxylic acid functional group or a sulfonic acid functional group and a fluorinated olefin in a polymerization medium to obtain a mixture containing a fluorinated copolymer, an unreacted monomer and the polymerization medium; and (II) a step of continuously or intermittently transferring the mixture to an evaporation vessel provided with a stirrer and heating it with stirring in the evaporation vessel to evaporate and recover the unreacted monomer and the polymerization medium.

Further, the process for producing a fluorinated copolymer according to a second embodiment of the present invention comprises the following steps (I') and (II'):

(I') a step of polymerizing a fluorinated monomer having a carboxylic acid functional group or a sulfonic acid functional group and a fluorinated olefin to obtain a mixture containing a fluorinated copolymer and an unreacted monomer; and (II') a step of continuously or intermittently transferring the mixture to an evaporation vessel provided with a stirrer and heating it with stirring in the evaporation vessel to evaporate and recover the unreacted monomer.

The fluorinated monomer having a carboxylic acid functional group is preferably a fluorovinyl ether represented by the following formula (1):

$$CF_2=CF-(O)_p-(CH_2)_q-(CF_2CFX)_r-(O)_s-(CF_2)_t-(CF_2CFX')_u-A^1 \quad (1)$$

wherein X is a fluorine atom or a trifluoromethyl group, X' is a fluorine atom or a trifluoromethyl group, $A^1$ is a carboxylic acid functional group, p is 0 or 1, q is an integer of from 0 to 12, r is an integer of from 0 to 3, s is 0 or 1, t is an integer of from 0 to 12, u is an integer of from 0 to 3, $1 \le p+s$, and $1 \le r+u$.

The fluorinated monomer having a sulfonic acid functional group is preferably a compound represented by the following formula (2) or (3):

$$CF_2=CF-O-R^{f2}-A^2 \quad (2)$$

$$CF_2=CF-R^{f2}-A^2 \quad (3)$$

wherein $R^{f2}$ is a $C_{1-20}$ perfluoroalkylene group, which may have an etheric oxygen atom and which may be linear or branched, and $A^2$ is a sulfonic acid functional group.

It is preferred that the fluorinated olefin is tetrafluoroethylene.

It is preferred that a stirring blade in the evaporation vessel provided with a stirrer is a helical ribbon blade.

It is preferred that in the step (II), the mixture is transferred to the evaporation vessel so that the overall coefficient of heat transfer becomes at least 80 kJ/m²·h·°C.

It is preferred that in the step (II'), the mixture is transferred to the evaporation vessel so that the overall coefficient of heat transfer becomes at least 80 kJ/m²·h·°C.

It is preferred that the temperature in the interior of the evaporation vessel provided with a stirrer is maintained at −20° C. to +20° C. from the higher one of boiling temperatures of the polymerization medium and the fluorinated monomer under the pressure in the evaporation vessel provided with a stirrer.

It is preferred that the amount of the unreacted monomer remaining is at most 1.0 mass % per 100 mass % of the fluorinated copolymer.

Advantageous Effects of Invention

According to the process for producing a fluorinated copolymer of the present invention, from a mixture containing a fluorinated copolymer, an unreacted monomer and a polymerization medium, the unreacted monomer and the polymerization medium can efficiently be recovered.

Further, according to the process for producing a fluorinated copolymer of the present invention, from a mixture containing a fluorinated copolymer and an unreacted monomer, the unreacted monomer can efficiently be recovered.

DESCRIPTION OF EMBODIMENTS

<Process for Producing Fluorinated Copolymer>

The process for producing a fluorinated copolymer according to a first embodiment of the present invention is a process comprising the following steps (I) and (II), applicable in the case of a polymerization method using a polymerization medium, such as an emulsion polymerization method, a solution polymerization method or a suspension polymerization method.

(I) a step of polymerizing a fluorinated monomer having a carboxylic acid functional group or a sulfonic acid functional group and a fluorinated olefin in a polymerization medium to obtain a mixture containing a fluorinated copolymer, an unreacted monomer and the polymerization medium; and (II) a step of continuously or intermittently transferring the mixture to an evaporation vessel provided with a stirrer and heating it with stirring in the evaporation vessel to evaporate and recover the unreacted monomer and the polymerization medium.

The process for producing a fluorinated copolymer according to a second embodiment of the present invention is a process comprising the following steps (I') and (II'), applicable in the case of a polymerization method using no polymerization medium (except for monomers) such as a bulk polymerization method.

(I') a step of polymerizing a fluorinated monomer having a carboxylic acid functional group or a sulfonic acid functional group and a fluorinated olefin to obtain a mixture containing a fluorinated copolymer and an unreacted monomer; and (II') a step of continuously or intermittently transferring the mixture to an evaporation vessel provided with a stirrer and heating it with stirring in the evaporation vessel to evaporate and recover the unreacted monomer.

(Fluorinated Monomer Having Carboxylic Acid Functional Group)

The fluorinated monomer having a carboxylic acid functional group is not particularly limited so long as it is a compound having at least one fluorine atom, an ethylenic double bond and a carboxylic acid functional group in its molecule, and known one may be used.

The fluorinated monomer having a carboxylic acid functional group is preferably a fluorovinyl ether represented by the following formula (1) in view of the production cost of the monomer, the reactivity with another monomer and excellent properties of the obtainable fluorinated copolymer.

$$CF_2=CF-(O)_p-(CH_2)_q-(CF_2CFX)_r-(O)_s-(CF_2)_t-(CF_2CFX')_u-A^1 \quad (1)$$

X is a fluorine atom or a trifluoromethyl group. Further, X' is a fluorine atom or a trifluoromethyl group. In a case where both X and X' are present in one molecule, they may be the same or different from each other.

$A^1$ is a carboxylic acid functional group. The carboxylic acid functional group means a carboxylic acid group (—COOH) itself or a functional group capable of being converted to a carboxylic acid group by hydrolysis or neutralization. The functional group capable of being converted to a carboxylic acid group may, for example, be —CN, —COF, —COOR¹ (wherein R¹ is a $C_{1-10}$ alkyl group), —COOM (wherein M is an alkali metal or a quaternary ammonium salt group), —COONR²R³ (wherein each of R² and R³ which may be the same or different, is a hydrogen atom or a $C_{1-10}$ alkyl group).

p is 0 or 1, q is an integer of from 0 to 12, r is an integer of from 0 to 3, s is 0 or 1, t is an integer of from 0 to 12, and us is an integer of from 0 to 3, provided that p and s are not simultaneously 0, and r and u are not simultaneously 0, that is, $1 \le p+s$, and $1 \le r+u$.

As specific examples of the fluorovinyl ether represented by the formula (1), the following compounds may be mentioned, and in view of easy production, preferred is a compound wherein p=1, q=0, r=1, s=0 or 1, t=1 to 3, and u=0 or 1, particularly preferred is $CF_2=CF-O-CF_2CF_2-CF_2-COOCH_3$:

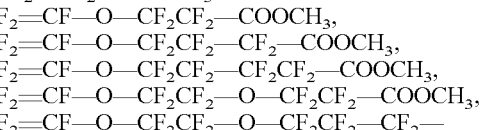

$CF_2=CF-O-CF_2CF_2-COOCH_3$,
$CF_2=CF-O-CF_2CF_2-CF_2-COOCH_3$,
$CF_2=CF-O-CF_2CF_2-CF_2CF_2-COOCH_3$,
$CF_2=CF-O-CF_2CF_2-O-CF_2CF_2-COOCH_3$,
$CF_2=CF-O-CF_2CF_2-O-CF_2CF_2-CF_2-COOCH_3$,

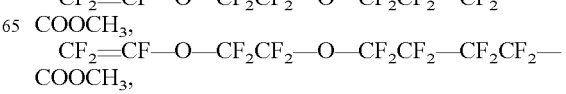

$CF_2=CF-O-CF_2CF_2-O-CF_2CF_2-CF_2CF_2-COOCH_3$,

CF$_2$=CF—O—CF$_2$—CF$_2$CF$_2$—O—CF$_2$CF$_2$—COOCH$_3$,
CF$_2$=CF—O—CF$_2$CF(CF$_3$)—O—CF$_2$CF$_2$—COOCH$_3$,
CF$_2$=CF—O—CF$_2$CF(CF$_3$)—O—CF$_2$—CF$_2$CF$_2$—COOCH$_3$.

(Fluorinated Monomer Having Sulfonic Acid Functional Group)

The fluorinated monomer having a sulfonic acid functional group is not particularly limited so long as it is a compound having at least one fluorine atom, an ethylenic double bond and a sulfonic acid functional group in its molecule, and known one may be used.

The fluorinated monomer having a sulfonic acid functional group is preferably a compound represented by the following formula (2) or (3) in view of the production cost of the monomer, the reactivity with another monomer and excellent properties of the obtainable fluorinated copolymer.

$$CF_2=CF-O-R^{f2}-A^2 \quad (2)$$

$$CF_2=CF-R^{f2}-A^2 \quad (3)$$

$R^{f2}$ is a $C_{1-20}$ perfluoroalkylene group, which may have an etheric oxygen atom and which may be linear or branched.

$A^2$ is a sulfonic acid functional group. The sulfonic acid functional group means a sulfonic acid group (—SO$_3$H) itself or a functional group capable of being converted to a sulfonic acid group by hydrolysis or neutralization. The functional group capable of being converted to a sulfonic acid group may, for example, be —SO$_3$M (wherein M is an alkali metal or a quaternary ammonium salt group), —SO$_2$F, —SO$_2$Cl or —SO$_2$Br.

As the compound represented by the formula (2), specifically, the following compounds are preferred.
CF$_2$=CF—O—(CF$_2$)$_{1-8}$—SO$_2$F,
CF$_2$=CF—O—CF$_2$CF(CF$_3$)O(CF$_2$)$_{1-8}$—SO$_2$F,
CF$_2$=CF[OCF$_2$CF(CF$_3$)]$_{1-5}$SO$_2$F.

As the compound represented by the formula (3), specifically, the following compound is preferred.
CF$_2$=CF(CF$_2$)$_{0-8}$—SO$_2$F,
CF$_2$=CF—CF$_2$—O—(CF$_2$)$_{1-8}$—SO$_2$F.

The fluorinated monomer having a sulfonic acid functional group is more preferably the following compounds, in view of easy industrial preparation.
CF$_2$=CFOCF$_2$CF$_2$SO$_2$F,
CF$_2$=CFOCF$_2$CF$_2$CF$_2$SO$_2$F,
CF$_2$=CFOCF$_2$CF$_2$CF$_2$CF$_2$SO$_2$F,
CF$_2$=CFOCF$_2$CF(CF$_3$)OCF$_2$CF$_2$SO$_2$F,
CF$_2$=CFOCF$_2$CF(CF$_3$)OCF$_2$CF$_2$CF$_2$SO$_2$F,
CF$_2$=CFOCF$_2$CF(CF$_3$)SO$_2$F,
CF$_2$=CFCF$_2$CF$_2$SO$_2$F,
CF$_2$=CFCF$_2$CF$_2$CF$_2$SO$_2$F,
CF$_2$=CF—CF$_2$—O—CF$_2$CF$_2$—SO$_2$F.

(Fluorinated Olefin)

As the fluorinated olefin, a $C_{2-3}$ fluoroolefin having at least one fluorine atom in its molecule may be used. The fluoroolefin may, for example, be TFE(CF$_2$=CF$_2$), chlorotrifluoroethylene (CF$_2$=CFCl), vinylidene fluoride (CF$_2$=CH$_2$), vinyl fluoride (CH$_2$=CHF), or hexafluoropropylene (CF$_2$=CFCF$_3$), and is particularly preferably TFE in view of excellent production cost of the monomer, reactivity with another monomer and properties of the obtainable fluorinated copolymer. Such a fluorinated olefin may be used alone or in combination of two or more.

(Another Monomer)

In the present invention, in addition to the fluorinated monomer having a carboxylic acid functional group or a sulfonic acid functional group and the fluorinated olefin, another monomer may further be copolymerized. Such another monomer may, for example, be CF$_2$=CF$_2$—R$^f$, CF$_2$=CF—OR$^f$ (wherein R$^f$ is a $C_{1-10}$ perfluoroalkyl group) or CF$_2$=CFO(CF$_2$)$_v$CF=CF$_2$ (wherein v is an integer of from 1 to 3). By copolymerizing another monomer, the flexibility and the mechanical strength of the obtainable ion exchange membrane can be improved. The proportion of another monomer is preferably at most 30 mass % to all the monomers (100 mass %) with a view to maintaining the ion exchange performance.

(Steps (I) and (I'))

In the case of the production process according to a first embodiment of the present invention, in a reactor, the fluorinated monomer having a carboxylic acid functional group or a sulfonic acid functional group and the fluorinated olefin are polymerized in a polymerization medium to obtain a mixture (an emulsion, a slurry or the like) containing a fluorinated copolymer, an unreacted monomer and the polymerization medium.

In the case of the production process according to a second embodiment of the present invention, in a reactor, the fluorinated monomer having a carboxylic acid functional group or a sulfonic acid functional group and the fluorinated olefin are polymerized to obtain a mixture containing a fluorinated copolymer and an unreacted monomer.

The polymerization method is selected from polymerization methods such as an emulsion polymerization method, a solution polymerization method, a suspension polymerization method and a bulk polymerization method. The polymerization method is preferably a solution polymerization method using no fluorinated emulsifying agent having a perfluoroalkyl group having at least 7 carbon atoms, the bioaccumulation property of which is a concern.

The polymerization medium used in the emulsion polymerization method is preferably water.

The emulsifying agent to be used in the emulsion polymerization method is preferably a perfluorocarboxylic acid type emulsifying agent.

The polymerization medium to be used in the solution polymerization method is preferably chlorofluorocarbon, hydrochlorofluorocarbon, hydrofluorocarbon, hydrofluoroether or the like, more preferably hydrofluorocarbon or hydrofluoroether which will not damage the ozone layer.

The hydrofluorocarbon is preferably one having from 4 to 10 carbon atoms, more preferably from 4 to 8 carbon atoms. If the hydrofluorocarbon has less than 4 carbon atoms or more than 10 carbon atoms, the boiling point of such a hydrofluorocarbon will be out of the desired temperature range (from 0 to 200° C., preferably from 10 to 100° C.). That is, when the hydrofluorocarbon has at least 4 carbon atoms, its boiling point is at least 0° C., such being suitable for storage and transfer. When the hydrofluorocarbon has at most 10 carbon atoms, its boiling point is at most 200° C., whereby the polymerization medium will easily be recovered from the slurry after polymerization.

The hydrofluorocarbon is preferably one having a ratio of the number of hydrogen atoms/the number of fluorine atoms (hereinafter referred to as H/F) on a molar basis of from 0.05 to 20, more preferably from 0.06 to 1. If the H/F ratio is less than 0.05, the solubility of the polymerization initiator described hereinafter will be insufficient. If the H/F ratio exceeds 20, the chain transfer constant of the polymerization reaction tends to be large, whereby a fluorinated copolymer having a desired molecular weight will not be obtained.

The molecular structure of the hydrofluorocarbon may be linear or branched.

As specific examples of the hydrofluorocarbon, the following compounds are mentioned.

$CF_3CF_2CH_2CH_3$,
$CF_3CH_2CF_2CH_3$,
$CHF_2CF_2CF_2CHF_2$,
$CH_3CF_2CHFCF_3$,
$CF_3CF_2CHFCF_3$,
$CF_3CF_2CF_2CF_2H$,
$(CF_3)_2CFCH_2CH_3$,
$CH_3CHFCF_2CF_2CH_3$,
$CH_3CF_2CF_2CF_2CHF_2$,
$CF_3CHFCHFCF_2CF_3$,
$CF_3CF_2CF_2CF_2CH_2CH_3$,
$CF_3CF_2CH_2CH_2CF_2CF_3$,
$CF_3CF_2CF_2CF_2CF_2CF_2H$,
$(CF_3)_2CFCHFCHFCF_3$,
$CH_3CF_2CF_2CF_2CF_2CF_2CF_2H$,
$CF_3CF_2CF_2CF_2CF_2CF_2CF_2H$,
$CF_3CF_2CF_2CF_2CF_2CF_2CH_2CH_3$,
$CF_3CF_2CF_2CF_2CF_2CF_2CF_2CHF_2$.

Since if the number of carbon atoms is too small, the boiling point tends to be too low, if the number of carbon atoms is too many, the boiling point tends to be too high, and if the number of hydrogen atoms is large, a copolymer having a high molecular weight will hardly be obtained, the hydrofluorocarbon is preferably a hydrofluorocarbon represented by $C_{n+m}F_{2n+1}H_{2m+1}$ (wherein n is an integer of from 2 to 8, and m is an integer of from 0 to 3), more preferably $CF_3CF_2CF_2CF_2CF_2CF_2H$ (1,1,1,2,2,3,3,4,4,5,5,6,6-tridecafluorohexane, H/F ratio:0.077), $CF_3CF_2CF_2CF_2CH_2CH_3$ (1,1,1,2,2,3,3,4,4-nonafluorohexane, H/F ratio:0.56) or $CF_3CF_2CF_2CF_2CF_2CF_2CH_2CH_3$ (1,1,1,2,2,3,3,4,4,5,5,6,6-tridecafluorooctane, H/F ratio: 0.38).

The hydrofluoroether is a hydrofluoroalkyl ether (hereinafter referred to as HFE represented by the following formula (4):

$R^4$—O—$R^5$ (4)

Each of $R^4$ and $R^5$ is a polyfluoroalkyl group, at least one of $R^4$ and $R^5$ has a hydrogen atom, and the total number of carbon atoms of $R^4$ and $R^5$ is from 3 to 8. The polyfluoroalkyl group is preferably a linear or branched hydrofluoroalkyl group or perfluoroalkyl group. In a case where either one of $R^4$ and $R^5$ is a perfluoroalkyl group, the other is a hydrofluoroalkyl group. If both $R^4$ and $R^5$ are a perfluoroalkyl group, such a compound has a high global warming potential. Further, $R^4$ and $R^5$ may be polyfluoroalkyl groups which are the same or different. The total number of fluorine atoms which $R^4$ and $R^5$ have is preferably larger than the total number of hydrogen atoms. If the number of hydrogen atoms is large, the chain transfer constant tends to be large, and accordingly the number of hydrogen atoms is preferably smaller, whereby the chain transfer constant will be smaller. The total number of fluorine atoms which $R^4$ and $R^5$ have is preferably at least 60%, more preferably at least 65% to the total number of hydrogen atoms and fluorine atoms. The total number of carbon atoms of $R^4$ and $R^5$ is from 3 to 8, preferably from 4 to 6. If the number of carbon atoms of $R^4$ and $R^5$ is too small, such a compound tends to have a low boiling point, and its handling efficiency as a polymerization medium is insufficient. If the number of carbon atoms of $R^4$ and $R^5$ is too large, such a compound has a high boiling point, and separation of a fluorinated copolymer and the polymerization medium tends to be difficult.

HFE is preferably at least one member selected from the group consisting of $CF_3CH_2OCF_2CHF_2$, $CHF_2CF_2CH_2OCF_2CHF_2$ and $CF_3CF_2CH_2OCF_2CHF_2$, more preferably $CF_3CH_2OCF_2CHF_2$.

The proportions of charge of the fluorinated monomer having a carboxylic acid functional group or a sulfonic acid functional group and the fluorinated olefin are selected so that the proportion of the monomer units in the obtainable fluorinated copolymer is within a desired range.

The proportion of charge of the fluorinated monomer having a carboxylic acid functional group or a sulfonic acid functional group is preferably such that the proportion of the units of the fluorinated monomer having a carboxylic acid functional group or a sulfonic acid functional group in the fluorinated copolymer is from 15 to 95 mass %.

The proportion of charge of the fluorinated olefin is preferably such that the proportion of the fluorinated olefin units in the fluorinated copolymer is from 5 to 85 mass %.

The proportion of charge of another monomer is preferably such that the proportion of the units of another monomer in the fluorinated copolymer is from 0 to 30 mass %.

The respective monomers may be charged all at once, or may be charged continuously or intermittently. From a viewpoint such that the concentration of each monomer in the reaction system is constant so that the composition of the fluorinated copolymer to be formed is uniform, it is preferred to continuously add and continuously react the fluorinated monomer having a carboxylic acid functional group or a sulfonic acid functional group and the fluorinated olefin.

The polymerization pressure (gauge pressure) is preferably from 0.1 to 5.0 MPaG, more preferably from 0.5 to 3.0 MPaG. Within such a range, the polymerization rate can be maintained to be a practically satisfactory level, and a high molecular weight fluorinated copolymer can be obtained.

The conditions and operations other than the polymerization pressure are not particularly limited, and reaction conditions can be selected from a wide range. For example, an optimum polymerization temperature is selected depending upon the type of the monomer, the reaction molar ratio and the like, and in view of industrial applicability, the polymerization temperature is preferably from 20 to 90° C., more preferably from 30 to 80° C.

To initiate polymerization, irradiation with ionizing radiation may be carried out, however, use of a polymerization initiator having high activity within the above-described preferred reaction temperature (20 to 90° C.), such as an azo compound or a peroxy compound is advantageous for industrial application.

The polymerization initiator may, for example, be a diacyl peroxide (such as disuccinic acid peroxide, benzoyl peroxide, lauroyl peroxide or bis(pentafluoropropionyl) peroxide), an azo compound (such as 2,2'-azobis(2-amidinopropane) hydrochloride, 4,4'-azobis(4-cyanovalerianic acid), dimethyl 2,2'-azobisisobutyrate, azobisisobutyronitrile, 2,2'-azobis(2-methylbutyronitrile), 1,1'-azobis(cyclohexane-1-carbonitrile) or dimethyl 1,1'-azobis(1-cyclohexanecarboxylate)), a peroxyester (such as t-butyl peroxyisobutyrate or t-butyl peroxypivalate), a peroxydicarbonate (such as diisopropyl peroxydicarbonate or bis(2-ethylhexyl)peroxydicarbonate), or a hydroperoxide (such as diisopropylbenzene hydroperoxide).

The amount of addition of the polymerization initiator is preferably from 0.0001 to 3 parts by mass, more preferably from 0.0001 to 2 parts by mass per 100 parts by mass of all the monomers. By reducing the amount of addition of the polymerization initiator, the molecular weight of the fluorinated copolymer can be made high. In addition to the polymerization initiator, a molecular weight-controlling agent or the like commonly used for solution polymerization may be added.

The molecular weight-controlling agent is preferably an alcohol (such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol), a hydrocarbon (such as n-pentane, n-hexane or cyclohexane), a hydrofluorocarbon (such as $CF_2H_2$), a ketone (such as acetone), a mercaptan (such as methylmercaptan), an ester (such as methyl acetate or ethyl acetate) or an ether (such as diethyl ether or methyl ethyl ether), more preferably an alcohol.

The amount of the molecular weight-controlling agent is preferably from 0.0001 to 50 parts by mass, more preferably from 0.001 to 10 parts by mass per 100 parts by mass of all the monomers.

(Steps (II) and (II'))

In the case of the production process according to a first embodiment of the present invention, while the mixture (emulsion or slurry) in the reactor is continuously or intermittently transferred to an evaporation vessel provided with a stirrer, the mixture is continuously heated in the evaporation vessel with stirring, to continuously evaporate and recover the unreacted monomer and the polymerization medium and separate them from the fluorinated copolymer.

In the case of the production process according to a second embodiment of the present invention, while the mixture in the reactor is continuously or intermittently transferred to an evaporation vessel provided with a stirrer, the mixture is continuously heated in the evaporation vessel with stirring, to continuously evaporate and recover the unreacted monomer to separate it from the fluorinated copolymer.

Since the fluorinated monomer having a carboxylic acid functional group or a sulfonic acid functional group may be decomposed by oxygen or moisture, the evaporation vessel is preferably capable of stirring the mixture transferred in an inert gas (e.g. nitrogen gas) atmosphere, in vacuum or reduced-pressure atmosphere.

As a stirring blade in the stirrer, a paddle blade, a turbine blade, an anchor blade, a helical ribbon blade or the like is preferred. The stirrer may have a scraping blade rotating while being rubbed against the wall surface, so as to prevent deposition of the fluorinated copolymer on the inner wall of the evaporation vessel. The stirring blade is preferably an anchor blade or a helical ribbon blade suitable for mixing a liquid having a high viscosity, and is particularly preferably a helical ribbon blade.

Although the optimum number of revolutions varies depending upon the shape of the stirring blade and the size of the evaporation vessel, the number of revolutions is preferably from about 30 to about 500 rpm, more preferably from 50 to 300 rpm, further preferably from 70 to 200 rpm.

The evaporation vessel is preferably one which can be heated e.g. by a jacket, so as to evaporate the polymerization medium or the unreacted monomer. The heating temperature is preferably from 20 to 200° C., more preferably from 40 to 180° C., further preferably from 50 to 150° C. The heating temperature is decided by the boiling points of the polymerization medium and the fluorinated monomer, and is preferably within the above temperature range, since the fluorinated monomer may be thermally decomposed. In order that the polymerization medium and the unreacted monomer are evaporated at a lower temperature, the pressure in the evaporation vessel may be reduced to the atmospheric pressure or below.

The pressure (absolute pressure) in the evaporation vessel is preferably from 0.1 to 200 kPa, more preferably from 0.5 to 100 kPa.

The mixture is continuously or intermittently transferred to the evaporation vessel. The mixture is preferably continuously transferred to the evaporation vessel. "The mixture is continuously transferred to the evaporation vessel" means a state where the mixture is always supplied to the evaporation vessel, and "the mixture is intermittently transferred to the evaporation vessel" means a state where a time when the mixture is supplied to the evaporation vessel and a time when it is not are alternately present. The supply amount per unit time may be constant or inconstant. If the mixture is charged into the evaporation vessel all at once and it is heated with stirring to evaporate and recover the polymerization medium and the unreacted monomer in such a state, the fluorinated copolymer will be agglomerated, the heat transfer from the evaporation vessel to the agglomerated fluorinated copolymer will be inhibited, and the polymerization medium and the unreacted monomer contained in the agglomerated fluorinated copolymer are hardly heated. Accordingly, the polymerization medium and the unreacted monomer cannot efficiently be recovered.

The supply amount per unit time when the mixture is transferred from the reactor to the evaporation vessel varies depending upon the size of the evaporation vessel and the type of the stirrer, and is preferably adjusted to a transfer rate to such an extent that the heat transfer to the fluorinated copolymer in the interior of the evaporation vessel will not be remarkably deteriorated. Specifically, it is preferably such an extent that the temperature in the interior of the evaporation vessel can be maintained to a temperature in the vicinity of the boiling point of the polymerization medium or the fluorinated monomer. More specifically, it is preferably such an extent that the temperature in the interior of the evaporation vessel is maintained at −20° C. to +20° C. from the higher one of the boiling temperatures of the polymerization medium and the fluorinated monomer under the pressure in the evaporation vessel. In order that the internal temperature of the evaporation vessel is within the above temperature range, the mixture may be heated before supplied to the evaporation vessel. Further, it is preferred to transfer the mixture to the evaporation vessel so that the overall coefficient of heat transfer is at least 80 kJ/m²·h·° C., more preferably at least 120 kJ/m²·h·° C., most preferably from 200 to 1,300 kJ/m²·h·° C. If the heat of evaporation of the polymerization medium and the fluorinated monomer will not exceed the amount of heat by heating, the internal temperature of the evaporation vessel will not be lower than the boiling points of the polymerization medium and the fluorinated monomer, and the fluorinated copolymer will not be agglomerated to inhibit heat transfer, whereby the recovery ratio of the unreacted monomer will be improved. When a sufficient amount of heat to evaporate the polymerization medium and the fluorinated monomer is supplied, the internal temperature of the evaporation vessel will not be remarkably higher than the boiling points of the polymerization medium and the fluorinated monomer, a fluorinated copolymer in the form of particles will be formed without consuming unnecessary thermal energy, the process time can be shortened, and the productivity will be improved.

The overall coefficient of heat transfer is a coefficient representing the heat transfer and is obtained from the following formula (5):

$$Q = UA\Delta T \quad (5)$$

wherein Q is the amount of heat, U is the overall coefficient of heat transfer, A is the heat transfer area, and ΔT is the temperature difference between the interior and the exterior.

As a method of recovering the evaporated unreacted monomer and polymerization medium, a method may, for example, be mentioned in which the evaporation vessel is evacuated or air by means of a cold trap or a heat exchanger, to recover the unreacted monomer and the polymerization medium.

(Fluorinated Copolymer)

The fluorinated copolymer obtainable by the production process of the present invention is a fluorinated copolymer of a fluorinated monomer having a carboxylic acid functional group or a sulfonic acid functional group, and a fluorinated olefin.

The average particle size of the fluorinated copolymer is preferably from 0.10 to 10 mm, more preferably from 0.5 to 5.0 mm, particularly preferably from 1.0 to 4.0 mm. When the average particle size of the fluorinated copolymer is within such a range, heat transfer from the evaporation vessel to the fluorinated copolymer will efficiently be carried out. The average particle size of the fluorinated copolymer can be evaluated by a sieving method.

The amount of the fluorinated monomer having a carboxylic acid functional group or a sulfonic acid functional group remaining in the fluorinated copolymer is preferably at most 1.0 mass %, more preferably at most 0.5 mass %, further preferably at most 0.3 mass % per 100 mass % of the fluorinated copolymer. When the amount of the remaining unreacted monomer is within the above range, the fluorinated monomer which is expensive can be efficiently recovered, whereby the production cost for the fluorinated copolymer can be suppressed.

The ion exchange capacity of the fluorinated copolymer is preferably from 0.5 to 2.0 meq/g dry resin when the fluorinated copolymer is used for an ion exchange membrane. Even when the ion exchange capacity of the fluorinated copolymer is large, the molecular weight of the fluorinated copolymer can be made high, whereby the mechanical property and the durability of the fluorinated copolymer will not be deteriorated. The ion exchange capacity of the fluorinated copolymer is preferably at least 0.6 meq/g dry resin, more preferably at least 0.7 meq/g dry resin, in view of the mechanical property and the electrochemical performance as an ion exchange membrane.

The molecular weight of the fluorinated copolymer relates to the mechanical performance and the film-forming property as an ion exchange membrane. The molecular weight of the fluorinated copolymer is preferably at least 150° C., more preferably from 170 to 340° C., further preferably from 170 to 300° C. by the TQ value.

The TQ value is a value relating to the molecular weight of a polymer, and is represented by a temperature at which the volume flow rate is 100 mm$^3$/sec. The volume flow rate is the amount of a polymer extruded represented by the unit mm$^3$/sec, when a polymer is melted and extruded from an orifice (diameter: 1 mm, length: 1 mm) at a certain temperature under an elevated pressure of 3 MPa. The TQ value is an index of the molecular weight of a polymer, and the higher the TQ value, the higher the molecular weight.

(Ion Exchange Membrane)

An ion exchange membrane can be obtained by forming the fluorinated copolymer obtained by the present invention into a membrane. A process for producing an ion exchange membrane comprises a step of forming the fluorinated copolymer into a membrane and a step of converting the carboxylic acid functional groups or the sulfonic acid functional groups in the fluorinated copolymer to a carboxylic acid by hydrolysis. Either of the membrane-forming step and the conversion step may be carried out first, however, it is preferred to carry out the membrane-forming step first and then carry out the conversion step.

The ion exchange membrane may be a laminate having a plurality of layers containing the fluorinated copolymer obtained by the production process of the present invention, the layers being differing in the ion exchange capacity of the fluorinated copolymer; may be a laminate of a layer containing the fluorinated copolymer having carboxylic acid functional groups and a layer containing the fluorinated copolymer having sulfonic acid functional groups, each obtained by the production process of the present invention; or may be a laminate having a reinforcing material.

The reinforcing material may, for example, be woven fabric (cloth), fibers or nonwoven fabric.

The ion exchange membrane may be applicable to alkali chloride electrolysis, dialysis, ozone electrolysis, electrolytic reduction, a membrane for a fuel cell, a polymer catalyst and the like, and is suitable for alkali chloride electrolysis of e.g. sodium chloride.

(Function and Effect)

According to the above-described process for producing a fluorinated copolymer of the present invention, while a mixture containing a fluorinated copolymer, an unreacted monomer and a polymerization medium as the case requires is continuously or intermittently transferred little by little to an evaporation vessel provided with a stirrer, the mixture is heated with stirring in the evaporation vessel to evaporate and recover the unreacted monomer and the polymerization medium. Accordingly, the fluorinated copolymer is less likely to be agglomerated in the evaporation vessel and is formed into relatively small particles as compared with a case of heating a large amount of the mixture all at once in a reactor or the like. Accordingly, heat transfer from the evaporation vessel to the fluorinated copolymer in the form of particles will efficiently be conducted, the polymerization medium and the unreacted monomer contained in the fluorinated copolymer in the form of particles are sufficiently heated and evaporated, whereby the polymerization medium and the unreacted monomer contained in the fluorinated copolymer in the form of particles can efficiently be recovered.

Further, since a fluorinated monomer having a carboxylic acid functional group or a sulfonic acid functional group which is expensive can efficiently be recovered, a fluorinated copolymer having excellent heat resistance, solvent resistance, chemical resistance, etc., suitable for an ion exchange membrane, can be produced at a low cost.

Further, a high quality fluorinated copolymer can be produced, since the amount of the remaining unreacted monomer is small.

EXAMPLES

Now, the present invention will be described in further detail with reference to Examples. However, it should be understood that the present invention is by no means restricted to such specific Examples.

Examples 1 and 2 are Examples of the present invention, and Example 3 is a Comparative Example.

(TQ Value)

The TQ value is a value relating the molecular weight of a polymer, and represents a temperature at which the volume flow rate is 100 mm$^3$/sec. The volume flow rate is represented by the amount of a fluorinated copolymer extruded represented by the unit mm³/sec when the fluorinated copolymer is melted and extruded from an orifice (diameter: 1 mm, length: 1 mm) at a constant temperature under an elevated pressure of 3 MPa, using Shimadzu Flow Tester CFT-100D (manufactured by Shimadzu Corporation).
(Ion Exchange Capacity)

Into a polycarbonate container, 0.7 g of a fluorinated copolymer and 5 mL of a 0.1N sodium hydroxide aqueous solution were added and left at rest at 60° C. for 18 hours to completely convert carboxylic acid functional groups or sulfonic acid functional groups of the fluorinated copolymer to Na-form. The solution was subjected to back titration with 0.1 N hydrochloric acid to obtain the amount of sodium hydroxide in the solution, thereby to calculate the ion exchange capacity of the fluorinated copolymer.
(Amount of Remaining Unreacted Monomer)

The amount of an unreacted monomer remaining in a fluorinated copolymer was calculated as mass % per 100 mass % of the fluorinated copolymer, obtained by analyzing a volatile content when the fluorinated copolymer is heated at 150° C., using headspace GC/MASS.

Example 1

(Step (I))

A stainless steel reactor (autoclave) having an internal capacity of 94 L was evacuated of air, and in the reactor, 33.9 kg of $CF_3CF_2CF_2CF_2CF_2CF_2H$(H/F ratio: 0.077, hereinafter referred to as solvent A) and 19.1 kg of a perfluorovinyl ether compound (hereinafter referred to as monomer A) having a carboxylic acid functional group represented by the following formula (I-1) were charged and heated until the internal temperature in the reactor became 67° C.:

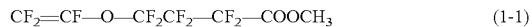

$$CF_2=CF—O—CF_2CF_2—CF_2—COOCH_3 \quad (1\text{-}1)$$

TFE was introduced until the internal pressure in the reactor became 0.95 MPaG, and 4.0 L of a solution obtained by dissolving 0.35 mass % of azobisisobutyronitrile as a polymerization initiator in solvent A was charged to initiate the polymerization. During the polymerization reaction, TFE was continuously introduced so as to maintain a pressure of 0.95 MPaG, and in addition, monomer A was continuously added in an amount corresponding to a TFE/monomer A molar ratio of 6.5. When the amount of TFE introduced from the initiation of the reaction reached 3.6 kg, the reactor was cooled to 40° C., and unreacted TFE was discharged out of the system to complete the polymerization. The obtained mixture of fluorinated copolymer, solvent A and monomer A will be referred to as slurry A. Further, solvent A was added so that the concentration of fluorinated copolymer contained in slurry A became 10 mass % to prepare slurry B.

Further, a small amount of slurry A was sampled, methanol was added thereto to agglomerate and separate the fluorinated copolymer, which was washed and dried to obtain a powder of the fluorinated copolymer. The TQ value of the obtained fluorinated copolymer was 240° C., and the ion exchange capacity of a copolymer obtained by hydrolyzing the fluorinated copolymer was 1.06 meq/g dry resin.
(Step (II))

A stainless steel autoclave having an internal capacity of 10 L provided with a helical ribbon stirring blade was evacuated of air to a degree of vacuum of 4 kPaA. Further, through a jacket of the autoclave, a steam under a pressure of 0.3 MPaG was made to flow at a rate of 2 kg/h for heating.

While the stirrer of the autoclave was rotated at a rate of 85 rpm, slurry B was continuously transferred to evaporate and recover polymerization medium and monomer A. While slurry B was transferred, the rate of transfer of slurry B was adjusted to maintain an internal pressure in the autoclave of from 2 to 10 kPaA and an internal temperature of from 55 to 65° C. (the boiling point of monomer A under the above pressure is from 40 to 70° C.), and 75 kg of slurry B was treated over a period of 3 hours (average supply amount per unit time: 25 kg/h). The autoclave was cooled, the pressure was recovered to normal pressure by nitrogen gas and the autoclave was opened, whereupon fluorinated copolymer in the form of particles was obtained. The amount of monomer A contained in fluorinated copolymer was 0.2 mass % per 100 mass % of fluorinated copolymer.

Example 2

(Step (I))

A stainless steel reactor (autoclave) having an internal capacity of 94 L was evacuated of air, and in the reactor, 12.7 kg of solvent A and 29.3 kg of a perfluorovinyl ether compound (hereinafter referred to as monomer B) having a sulfonic acid functional group represented by the following formula (1-2) were charged and heated until the internal temperature in the reactor became 75° C.:

$$CF_2=CF—O—CF_2CF(CF_3)OCF_2CF_2—SO_2F \quad (1\text{-}2)$$

TFE was introduced until the internal pressure in the reactor became 1.085 MPaG, and 2.0 L of a solution obtained by dissolving 0.16 mass % of dimethyl 2,2'-azobisisobutyrate as a polymerization initiator in solvent A was charged to initiate the polymerization. During the polymerization reaction, TFE was continuously introduced so as to maintain a pressure of 1.085 MPaG. When the amount of TFE introduced from the initiation of the reaction reached 4.1 kg, the reactor was cooled to 40° C., and unreacted TFE was discharged out of the system to complete the polymerization. The obtained mixture of fluorinated copolymer, solvent A and monomer B will be referred to as slurry C. Further, solvent A was added so that the concentration of fluorinated copolymer contained in slurry C became 10 mass % to prepare slurry D. Further, a small amount of slurry D was sampled, $CF_3CH_2OCF_2CF_2H$ was added thereto to agglomerate and separate fluorinated copolymer, which was washed and dried to obtain a powder of fluorinated copolymer. The TQ value of the obtained fluorinated copolymer was 231° C., and the ion exchange capacity of a copolymer obtained by hydrolyzing the fluorinated copolymer was 1.11 meq/g dry resin.
(Step (II))

A stainless steel autoclave having an internal capacity of 10 L provided with a helical ribbon stirring blade was evacuated of air to a degree of vacuum of 4 kPaA. Further, through a jacket of the autoclave, a steam under normal pressure was made to flow at a rate of 10 kg/h for heating.

While the stirrer of the autoclave was rotated at a rate of 85 rpm, slurry D was continuously transferred to evaporate and recover polymerization medium and monomer B. While slurry D was transferred, the rate of transfer of slurry D was adjusted to maintain an internal pressure in the autoclave of from 2 to 20 kPaA and an internal temperature of from 55 to 65° C. (the boiling point of monomer B under the above pressure is from 42 to 90° C.), and 87 kg of slurry D was treated over a period of 8 hours (average supply amount per unit time: 11 kg/h). The autoclave was cooled, the pressure was recovered to normal pressure by nitrogen gas and the autoclave was opened, whereupon fluorinated copolymer in the form of particles was obtained. The amount of monomer B contained in fluorinated copolymer was 0.3 mass % per 100 pass % of the fluorinated copolymer.

Example 3

Into a stainless steel autoclave having an internal capacity of 100 L provided with a helical ribbon stirring blade, 75 kg of slurry B was charged, and while the stirrer was rotated at 85 rpm, a steam under a pressure of 0.3 MPaG was made to flow through a jacket of the autoclave at a rate of 2 kg/h for heating.

The autoclave was connected to a vacuum line, and polymerization medium and monomer A were evaporated and recovered over a period of 3 hours. Then, the autoclave was cooled, the pressure was recovered to normal pressure with nitrogen glass, and the autoclave was opened, whereupon fluorinated copolymer was attached in the form of a sheet to the inner wall of the autoclave, and a part thereof was agglomerated. The amount of monomer A contained in fluorinated copolymer was 2.2 mass % per 100 mass % of fluorinated copolymer.

INDUSTRIAL APPLICABILITY

According to the process for producing a fluorinated copolymer of the present invention, a polymerization medium and an unreacted fluorinated monomer can efficiently be recovered, whereby a fluorinated copolymer to be used for an ion exchange membrane for alkali chloride electrolysis can be produced at a low cost.

What is claimed is:

1. A process for producing a fluorinated copolymer, the process comprising:
   (I) polymerizing a fluorinated monomer having a carboxylic acid functional group or a sulfonic acid functional group and a fluorinated olefin by a solution polymerization method in a polymerization medium to obtain slurry containing a fluorinated copolymer, an unreacted monomer and the polymerization medium;
   (II) continuously or intermittently transferring the slurry to an evaporation vessel provided with a stirrer and heating the slurry with stirring in the evaporation vessel under a pressure below atmospheric pressure to evaporate and recover the unreacted monomer and the polymerization medium, while keeping the fluorinated copolymer in the evaporation vessel; and
   (III) taking out the fluorinated copolymer from the evaporation vessel after finishing the recovery of the unreacted monomer and the polymerization medium,
   wherein a stirring blade in the evaporation vessel is a scraping blade which rubs against a wall surface of the evaporation vessel when rotating.

2. The process for producing a fluorinated copolymer according to claim 1, wherein the fluorinated monomer having a sulfonic acid functional group is a compound represented by the following formula (2) or (3):

$$CF_2=CF-O-R^{f2}-A^2 \quad (2)$$

$$CF_2=CF-R^{f2}-A^2 \quad (3)$$

wherein $R^{f2}$ is a $C_{1-20}$ perfluoroalkylene group, which may contain an etheric oxygen atom, and which may be linear or branched, and $A^2$ is a sulfonic acid functional group.

3. The process for producing a fluorinated copolymer according to claim 1, wherein a stirring blade in the evaporation vessel is a helical ribbon blade.

4. The process for producing a fluorinated copolymer according to claim 1, wherein in the step (II), the slurry is transferred to the evaporation vessel so that the overall coefficient of heat transfer becomes at least 80 kJ/m²·h·° C.

5. The process for producing a fluorinated copolymer according to claim 1, wherein the amount of the unreacted monomer remaining is at most 1.0 mass % per 100 mass % of the fluorinated copolymer.

6. A process for producing a fluorinated copolymer, the process comprising:
   (I') polymerizing a fluorinated monomer having a carboxylic acid functional group or a sulfonic acid functional group and a fluorinated olefin by a bulk polymerization method to obtain slurry containing a fluorinated copolymer and an unreacted monomer;
   (II') after the polymerizing of the fluorinated monomer and the fluorinated olefin is completed, continuously or intermittently transferring the slurry to an evaporation vessel provided with a stirrer and heating the slurry with stirring in the evaporation vessel under a pressure below atmospheric pressure to evaporate and recover the unreacted monomer, while keeping the fluorinated copolymer in the evaporation vessel; and
   (III') taking out the fluorinated copolymer from the evaporation vessel after finishing the recovery of the unreacted monomer,
   wherein a stirring blade in the evaporation vessel is a scraping blade which rubs against a wall surface of the evaporation vessel when rotating.

7. The process for producing a fluorinated copolymer according to claim 6, wherein the fluorinated monomer having a sulfonic acid functional group is a compound represented by the following formula (2) or (3):

$$CF_2=CF-O-R^{f2}-A^2 \quad (2)$$

$$CF_2=CF-R^{f2}-A^2 \quad (3)$$

wherein $R^{f2}$ is a $C_{1-20}$ perfluoroalkylene group, which may contain an etheric oxygen atom, and which may be linear or branched, and $A^2$ is a sulfonic acid functional group.

8. The process for producing a fluorinated copolymer according to claim 6, wherein a stirring blade in the evaporation vessel is a helical ribbon blade.

9. The process for producing a fluorinated copolymer according to claim 6, wherein in the step (II'), the slurry is transferred to the evaporation vessel so that the overall coefficient of heat transfer becomes at least 80 kJ/m²·h·° C.

10. The process for producing a fluorinated copolymer according to claim 6, wherein the amount of the unreacted monomer remaining is at most 1.0 mass % per 100 mass % of the fluorinated copolymer.

* * * * *